United States Patent [19]

Kitada et al.

[11] Patent Number: 5,050,158
[45] Date of Patent: Sep. 17, 1991

[54] MAGNETIC CLAMP FOR A DISK MEDIUM

[75] Inventors: Yasuo Kitada, Odawara; Toshiyasu Hattori, Minamiashigara, both of Japan

[73] Assignee: Hitachi, Ltd., Tokyo, Japan

[21] Appl. No.: 277,648

[22] Filed: Nov. 29, 1988

[30] Foreign Application Priority Data

Dec. 2, 1987 [JP] Japan ................ 62-303260

[51] Int. Cl.$^5$ .............. G11B 25/00; G11B 5/84; G11B 17/02
[52] U.S. Cl. ............................ 369/270; 369/271; 369/290; 360/99.04; 360/99.05; 360/99.12
[58] Field of Search ................ 369/270, 271

[56] References Cited

U.S. PATENT DOCUMENTS

| | | | |
|---|---|---|---|
| 4,510,592 | 4/1985 | Kanamaru et al. | 369/270 |
| 4,587,647 | 5/1986 | Mak et al. | 369/270 |
| 4,802,158 | 1/1989 | Ogusu | 369/270 |

FOREIGN PATENT DOCUMENTS 61-177671 8/1986 Japan .

Primary Examiner—Stuart S. Levy
Assistant Examiner—Kenneth B. Wells
Attorney, Agent, or Firm—Fay, Sharpe, Beall, Fagan, Minnich & McKee

[57] ABSTRACT

A magnetic clamp for a disk medium comprises a disk medium table for holding a disk medium, a spindle which supports the disk medium table rotatably, a hollow-cylindrical inner magnetic core and ring-shaped outer magnetic core each disposed inside the disk medium table concentrically with the spindle, a linkage magnetic core for connecting the inner and outer cores, and a permanent magnet inserted in any of the cores. The three cores form a magnetic circuit so that the magnetic flux passing through the magnetic circuit has a direction which is virtually coincident with the direction of magnetization of the permanent magnet.

9 Claims, 1 Drawing Sheet

MAGNETIC CLAMP FOR A DISK MEDIUM

BACKGROUND OF THE INVENTION

This invention relates to a magnetic clamp for a recording and reproducing disk, and particularly to a magnetic clamp operative suitably to clamp an optical recording disk medium on the spindle of the optical disk apparatus.

The majority of optical disk clamping devices for holding an optical disk on the spindle are based on the mechanical scheme as described, for example, in Japanese Patent Unexamined Publication No. 61-177671.

FIGS. 1 and 2 show a clamping magnet which is conceivably useful as a means of clamping an optical disk using the magnetic force. Provided on a base 26 are a motor 22, a spindle 28 which is the rotary shaft of the motor 22, and a disk table 29 formed on the top of the spindle 28. The optical recording disk apparatus comprises a spindle assembly 22, 28 and 29, an optical head 24 for recording or reproducing signals on the disk 23, and a rail 27 for coarsely moving the optical head 24 in the disk radial direction. The spindle 28 and disk table 29 are made of non-magnetic material such as stainless steel. Incorporated in the disk table 29 is a clamping permanent magnet 21, which holds the optical disk 23 by magnetically drawing a magnetic member 23A provided on the disk. Generally, optical disks such as a 5-inch disk have in their central section a formation of a magnetic (iron) disc with a diameter of about 15-20 mm and a thickness of about 1 mm, and the disks have a total thickness of about 5 mm in the central section. The disk drawing force is created by the magnetic flux which passes through the magnetic disc.

In order for the clamping magnet 21 to draw the disk 23 with a sufficient force, it should be a strong magnet and located closely to the disk 23 for the efficient exertion. The optical head 24 includes a fine actuator 25 which functions to move the lens up and down so that the recording/reproducing laser beam is always focused on the disk recording surface (i.e., auto-focus function) or to cause the focused laser beam to follow a track on the disk 23 (i.e., tracking servo function), or has both of these functions. The fine actuator 25, in most cases, is driven by a voice coil motor which uses a magnet and a coil. In order for the fine actuator 25 to focus the laser beam to form a small spot, it must be located sufficiently close to the disk 23. Accordingly, when the optical head 24 is positioned inwardly, i.e., approach to the center of the disk 23, the clamping magnet 21 and fine actuator 25 are in close positions, and unfavorably the optical head 24 is affected by the magnetic flux produced by the clamping magnet 21. The permanent magnet 21 is polarized alternately at a certain interval along the circumference of the ring-shaped magnetic plate, and its magnetic flux (magnetic field) 21F draws the magnetic disc 23A which is secured at the center of the optical disk so that it is fixed on the spindle 28. When the clamping magnet 21 is polarized as shown in FIG. 2, for example, it produces a revolving magnetic field as the disk 23 rotates, which possibly causes the optical head 24 to vibrate in the disk radial direction.

SUMMARY OF THE INVENTION

As described above, it was revealed that the magnetic clamp as shown in FIGS. 1 and 2 has its significant magnitude of leakage flux produced by the magnet affecting peripheral devices, (e.g., lens driver) due to its open magnetic circuit. The above-mentioned arrangement is not comprehensive against the adverse effect of the clamping magnet (permanent magnet) on the external devices. Resulting problems include the creation of unwanted external forces to the optical head due to the interference of the magnetic flux of the clamping magnet with the magnet used in the precise positioning mechanism for the optical head (fine actuator), and the creation of noises in the servo signal. In addition, when the clamping magnet polarized alternately on its circumference as shown in FIG. 2 rotates with the disk, the resulting revolving magnetic field affects the optical head actuator, causing the optical head to vibrate. The structure of optical disk apparatus does not allow the clamping magnet and optical head fine actuator to be distant from each other enough to neglect their magnetic interference, and therefore the structure needs to be devised so that the magnetic flux of the clamping magnet does not leak to the outside.

An object of this invention is to provide a magnetic clamp for a disk medium, in which the optical head is prevented from having degraded positioning accuracy and also having vibration through the prevention of influence of the leakage magnetic field of the clamping magnet on the optical head actuator.

In order to achieve the above objective, the inventive magnetic clamp for a disk medium has its clamping magnet formed of a shaft or ring-shaped inner core and a ring-shaped outer core disposed concentrically around the disk drive spindle to confront each other through the magnetic gap at the top and a linkage core which connects the inner and outer cores at their bottom. Consequently, the magnet device forms a closed magnetic circuit in which the magnetic flux virtually encircles the above-mentioned three cores excluding the magnetic gap.

As a preferred embodiment of the invention, the magnetic clamp is formed such that a magnetic pole of one polarity is formed uniformly in the circumferential direction on the inner core upper surface which confronts the recording disk and a magnetic pole of another polarity is formed uniformly in the circumferential direction on the outer core upper surface which confront the recording disk, so that a radial magnetic field is produced in the magnetic gap and the recording disk is drawn by the radial magnetic field.

Next the operation of the foregoing arrangement will be explained. Since the clamping magnet device forms a closed magnetic circuit by its inner, outer and linkage cores, virtually no magnetic flux leaks to the outside except at the magnetic gap. Consequently, the actuator coil and magnet of the optical head in close vicinity to the clamping magnet are prevented from being affected by the leakage flux, and the optical head is protected from unwanted external forces and the servo signal is cleared of noises.

The optical head actuator includes a coarse actuator which moves the whole optical head in the disk radial direction and a fine actuator (a mirror actuator which rotates a tracking servo mirror and a focus actuator which performs auto-focusing by moving the objective lens back and forth). There is virtually no influence of leakage flux even on the fine actuator which comes close to the clamping magnet during the operation.

A magnetic pole of one polarity is formed on the top of the inner core and a magnetic pole of another polarity is formed uniformly in the circumferential direction on the top of the outer core. A uniform radial magnetic field is distributed in the circumferential direction between the cores, and even if a little leakage flux reaches the head actuator, a revolving magnetic field is not produced by the rotation of the magnetic disk and the vibration of head is prevented.

DESCRIPTION OF THE PREFERRED EMBODIMENT

Figure 3:
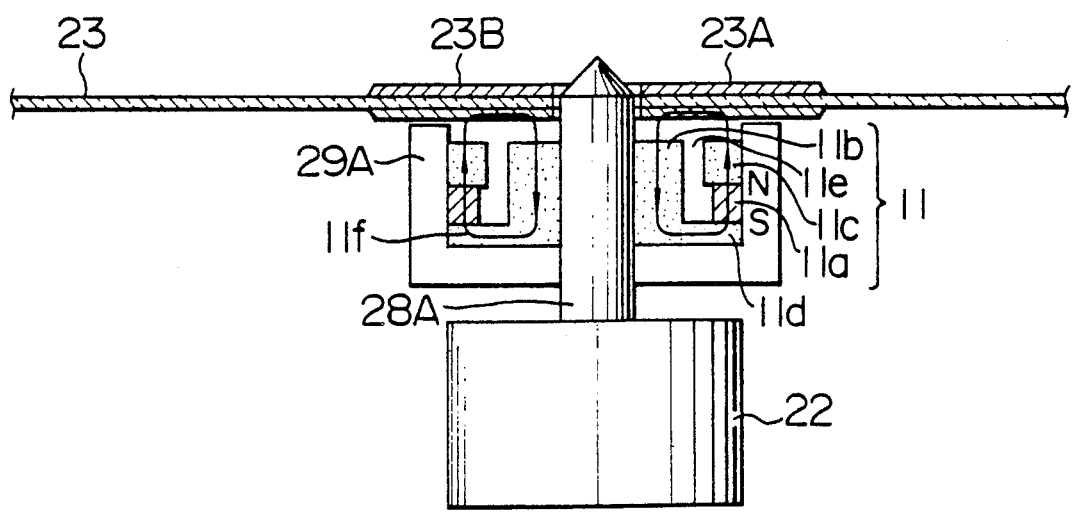
FIG. 3 is a general side view of the magnetic clamp embodying the present invention.

In FIG. 3, showing an embodiment of this invention, a spindle 28A driven by a motor 22 is made up of a disk table 29A for mounting a disk medium 23 and other members. The disk table 29A is made of nonmagnetic material, e.g., stainless steel or aluminum, and it has a generally disc-shaped bottom and cylindrical side wall. The disk table 29A is bored at its bottom center, and the spindle 28A is inserted in the hole and bonded to the table. Forming the disk table 29A of nonmagnetic material prevents the magnetic flux of a permanent magnet from leaking out of the disk table 29A. A magnet 11 for forming a closed magnetic circuit is placed within the space defined by the bottom and cylindrical side wall of the disk table 29A.

In FIG. 3, the magnet 11 is made up of a ring-shaped permanent magnet 11a magnetized uniformly in the circumferential direction with its top and bottom being the N pole and S pole, respectively, a yoke 11b (ring-shaped inner core), e.g. made of annealed steel, a ring-shaped outer core 11c, and a linkage core 11d which is part of the yoke 11b, all assembled concentrically with the spindle 28A. A magnetic gap 11e of about 1-2 mm is formed in the upper space defined by the yoke 11b, yoke 11c and disk, and a magnetic field for drawing the disk is produced in the gap 11e. The whole magnet device 11 is fitted on the disk table 29A.

Figure 1:
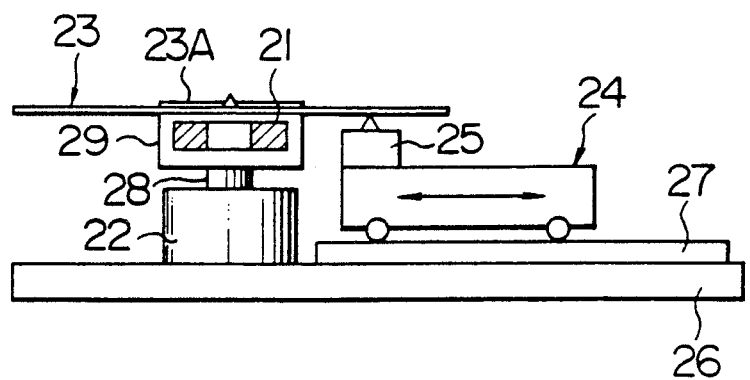
FIGS. 1 and 2 are diagrams showing, as an example, the optical disk clamp utilizing the permanent magnet drawing force, FIG. 1 being a general side view of the optical disk recording-reproducing apparatus, FIG. 2 being a plan view of the permanent magnet.
Figure 2:
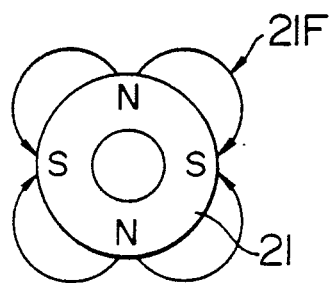

When an optical disk 23 is mounted, a closed magnetic circuit is completed by a magnetic member 23B of the disk in which a magnetic flux 11f is conducted. When the optical disk 23 is absent, a closed magnetic circuit for a magnetic flux which does not pass through the magnetic member 23A is formed. On this account, there is virtually no magnetic flux leaking from the disk table 29A to the outside, and consequently the optical head 24 and fine actuator 25 are free from unwanted external forces and the servo signal is free from noises. Moreover, even if saturated yokes allow the magnetic flux to leak, they do not produce a magnetic field with alternating poles in the circumferential direction, as opposed to the case shown in FIG. 2, and therefore the revolving spindle does not produce periodic external forces and does not cause the optical head 24 to vibrate.

As described above in detail, the inventive magnetic clamp for a disk medium is designed so that the clamping magnet device forms a closed magnetic circuit, which virtually eliminates the leakage flux from the magnet device to the outside. Consequently, application of unwanted harmful external forces to the fine actuator of optical head and generation of noises in the servo signal can effectively be prevented.

Although in the foregoing embodiment the disk mounting table is made separately from the spindle, this invention is not confined to this scheme, but both members may be formed integrally.

Although in the foregoing embodiment the permanent magnet is inserted in the outer core, this invention is not confined to this scheme, but it may be inserted in the inner core to accomplish equally the purpose and effect of the invention.

What is claimed is:

1. A magnetic clamp device for clamping a disk medium having magnetic material, comprising:
    a driver for rotation the disk medium,
    a spindle rotated by said driver,
    a disk medium table provided at the upper section of said spindle and adapted to hold the disk medium,
    an inner magnetic core made of magnetic material and shaped in a hollow cylinder, said inner core being mounted on said disk medium table concentrically with said spindle,
    an outer magnetic core made of magnetic material and shaped generally in a ring, said outer core being mounted on said disk medium table concentrically with said spindle,
    a linkage magnetic core made of magnetic material having opposite ends,
    a magnetic gap formed between and directly adjacent upper end portions of said inner and outer cores, and
    a permanent magnet having opposite end portions connected serially between one of said inner and outer cores and said linkage core, wherein one said end of said permanent magnet is connected to a bottom portion of said one core, the other end of said permanent magnet is connected to one said end of said linkage core, and the other end of said linkage core is connected to a bottom portion of the other of said inner and outer cores to form a magnetic circuit closed by said magnetic gap.

2. A magnetic clamp device according to claim 1, wherein said permanent magnet is placed between said outer magnetic core and said linkage core.

3. A magnetic clamp device according to claim 1, wherein said inner and outer magnetic cores have opposite polarities of magnetic pole at the top end surface thereof and have a unique polarity of magnetic pole in the circumferential direction on said top end surface.

4. A supporting structure for mounting on a rotary spindle of a disk apparatus a disk medium having a hole at the center thereof and a magnetic section in the periphery thereof, said structure comprising:
    supporting means made of non-magnetic material provided on said spindle and adapted to support said disk medium on a plane perpendicular to the axial direction of said spindle;
    a permanent magnet and magnetic means assembled on said supporting means; said magnetic means, permanent magnet and magnetic section of said disk medium forming a closed magnetic circuit, with two parts of said magnetic circuit being formed in parallel to the axial direction of said spindle; and
    said magnetic means including a first yoke and a second yoke, each having upper and lower axially opposed end portions disposed in said supporting means, each of said upper end portions of said first and second yokes being disposed opposite to said magnetic section of said disk medium, one of said yokes having a linkage core, said permanent magnet being disposed between the lower end portion of the other of said yokes and said linkage core so that a magnetic circuit is formed by said first yoke, said magnetic section of said disk medium, said second yoke, and said permanent magnet.

5. A supporting structure according to claim 4, wherein said supporting means has a bottom and a cylindrical side wall, said permanent magnet and magnetic means have a ring-shape, said permanent magnet is placed in contact with the inner surface of said side wall, and one of said yokes of said magnetic means is placed so that the inner surface thereof is in contact with said spindle.

6. A supporting structure according to claim 4, wherein said permanent magnet is placed so that alternating poles thereof are in parallel to the axial direction of said spindle.

7. A supporting structure according to claim 4, wherein said supporting means has a bottom and side wall so as to form an inner spaced, said assembly of permanent magnet and magnetic means being accommodated and fixed in said inner space of said supporting means.

8. A supporting structure according to claim 7, wherein the upper end of said side wall is located lower than the highest portion of said spindle.

9. A supporting structure according to claim 7, wherein said supporting means is formed integrally with said spindle.

* * * * *